(12) United States Patent
Kirsten

(10) Patent No.: US 7,407,704 B2
(45) Date of Patent: *Aug. 5, 2008

(54) PROCESS FOR ADHESIVE SEPARATION OF BONDED JOINTS

(75) Inventor: Christian Kirsten, Burscheid (DE)

(73) Assignee: Henkel KGAa, Duesseldorf (DE)

( * ) Notice: Subject to any disclaimer, the term of this patent is extended or adjusted under 35 U.S.C. 154(b) by 466 days.

This patent is subject to a terminal disclaimer.

(21) Appl. No.: 10/930,571

(22) Filed: Aug. 31, 2004

(65) Prior Publication Data

US 2005/0039848 A1 Feb. 24, 2005

Related U.S. Application Data

(62) Division of application No. 10/111,958, filed as application No. PCT/EP00/10267 on Oct. 18, 2000, now abandoned.

(30) Foreign Application Priority Data

Oct. 27, 1999 (DE) ................................. 199 51 599

(51) Int. Cl.
*B32B 5/16* (2006.01)
*B29C 63/00* (2006.01)

(52) U.S. Cl. ..................... 428/323; 428/328; 428/330; 156/344

(58) Field of Classification Search ................. 428/402; 156/344

See application file for complete search history.

(56) References Cited

U.S. PATENT DOCUMENTS

| | | |
|---|---|---|
| 3,564,515 A | 2/1971 | Gratien |
| 3,620,875 A | 11/1971 | Guglielmo, Sr. et al. |
| 4,083,901 A | 4/1978 | Schonfeld et al. |
| 4,176,054 A | 11/1979 | Kelley |
| 4,254,201 A | 3/1981 | Sawai et al. |
| 4,548,862 A | 10/1985 | Hartman |
| 4,635,415 A | 1/1987 | Schumacher et al. |
| 4,810,799 A | 3/1989 | Zanker et al. |
| 4,849,262 A | 7/1989 | Uhl et al. |
| 4,882,399 A | 11/1989 | Tesoro et al. |
| 5,064,494 A | 11/1991 | Duck et al. |
| 5,143,987 A | 9/1992 | Haensel et al. |
| 5,185,422 A | 2/1993 | Drouve et al. |
| 5,240,626 A | 8/1993 | Thakur et al. |
| 5,338,611 A | 8/1994 | Lause et al. |
| 5,391,595 A | 2/1995 | Clark, Jr. et al. |
| 5,574,123 A | 11/1996 | Bock et al. |
| 5,620,794 A | 4/1997 | Burkart et al. |
| 5,695,901 A | 12/1997 | Selim |
| 5,710,215 A | 1/1998 | Abend |
| 5,714,238 A | 2/1998 | Komagata et al. |
| 5,786,030 A | 7/1998 | Ahmed et al. |
| 5,800,866 A | 9/1998 | Myers et al. |
| 5,820,664 A | 10/1998 | Gardiner et al. |
| 5,833,795 A | 11/1998 | Smith et al. |
| 5,846,426 A | 12/1998 | Boos et al. |
| 5,910,522 A | 6/1999 | Schmidt et al. |
| 5,925,455 A | 7/1999 | Bruzzone et al. |
| 5,985,435 A | 11/1999 | Czaplicki et al. |
| 5,994,422 A | 11/1999 | Born et al. |
| 6,004,425 A | 12/1999 | Born et al. |
| 6,011,307 A | 1/2000 | Jiang et al. |
| 6,056,844 A * | 5/2000 | Guiles et al. ............. 156/272.4 |
| 6,183,658 B1 * | 2/2001 | Lesniak et al. ........... 252/62.56 |
| 6,245,177 B1 | 6/2001 | Luhmann |
| 6,348,548 B1 | 2/2002 | Abend |
| 6,448,338 B1 | 9/2002 | Born et al. |
| 6,472,475 B1 | 10/2002 | Lanoye et al. |
| 6,591,125 B1 | 7/2003 | Buse et al. |
| 6,592,745 B1 | 7/2003 | Feldman et al. |
| 6,602,989 B1 | 8/2003 | Sadik et al. |
| 6,605,200 B1 | 8/2003 | Mao et al. |
| 6,610,269 B1 | 8/2003 | Klaveness et al. |

(Continued)

FOREIGN PATENT DOCUMENTS

DE 158973 * 2/1983

(Continued)

OTHER PUBLICATIONS

R. V. Decahau et al., "Microwave Processing and Engineering", VCH, Verlagsgesellschaft, pp. 34-44 (1986).

(Continued)

*Primary Examiner*—Sheeba Ahmed
(74) *Attorney, Agent, or Firm*—Steven C. Bauman; James F. Piotrowski

(57) ABSTRACT

The reversible separation of bonded joints by applying alternating electromagnetic fields is described. The bonded joint consists of at least one primer layer which contains nanoscale particles which have ferromagnetic, ferrimagnetic, superparamagnetic or piezoelectric properties. As a result of the alternating electromagnetic fields, large amounts of localised heat are produced in the primer layer of the bonded joint. This localised heat input causes, in the case of adjacent thermoplastic adhesive layers, softening of the thermoplastic binder. If thermoset adhesives are adjacent to the boundary layer of the primer, then the cross-linked structure in the binder matrix is broken up due to the high degree of localised warming. In both cases quasi-adhesive substrate separation with a low energy input is enabled as a result of the high localised warming of the boundary layer.

19 Claims, No Drawings

U.S. PATENT DOCUMENTS

| | | | |
|---|---|---|---|
| 6,613,713 | B2 | 9/2003 | Becke et al. |
| 6,855,760 | B1 * | 2/2005 | Kirsten et al. .............. 524/394 |
| 7,147,742 | B2 * | 12/2006 | Kirsten .................... 156/272.2 |
| 2003/0168640 | A1 * | 9/2003 | Kirsten ...................... 252/500 |
| 2004/0026028 | A1 * | 2/2004 | Kirsten et al. ........... 156/272.4 |
| 2005/0039848 | A1 * | 2/2005 | Kirsten .................... 156/272.4 |
| 2005/0252607 | A1 * | 11/2005 | Kirsten et al. ........... 156/272.4 |

FOREIGN PATENT DOCUMENTS

| | | |
|---|---|---|
| DE | 1589 73 | 9/1983 |
| DE | 35 01 490 | 7/1986 |
| DE | 37 09 852 A1 | 10/1988 |
| DE | 41 30 268 | 3/1992 |
| DE | 43 28 108 | 2/1995 |
| DE | 42 30 116 | 10/1995 |
| DE | 195 02 381 A1 | 8/1996 |
| DE | 195 12 427 | 10/1996 |
| DE | 195 18 673 A1 | 11/1996 |
| DE | 195 26 351 | 1/1997 |
| DE | 196 49 893 | 6/1997 |
| DE | 199 14 136 | 10/1997 |
| DE | 197 26 282 | 12/1998 |
| DE | 197 30 425 A1 | 1/1999 |
| DE | 198 32 629 | 2/2000 |
| DE | 199 54 960 | 6/2000 |
| DE | 199 04 835 | 8/2000 |
| DE | 199 24 138 | 11/2000 |
| EP | 0 131 903 A2 | 1/1985 |
| EP | 0 212 511 A1 | 3/1987 |
| EP | 0 237 657 A1 | 9/1987 |
| EP | 0 356 715 A1 | 3/1990 |
| EP | 0 417 540 A2 | 8/1990 |
| EP | 0 510 476 A1 | 10/1992 |
| EP | 0 545 033 A2 | 6/1993 |
| EP | 0 671 423 A1 | 9/1995 |
| EP | 0 521 825 | 8/1996 |
| EP | 0 922 720 A1 | 12/1997 |
| EP | 0 735 121 | 5/2001 |
| EP | 0 598 873 B1 | 9/2002 |
| GB | 1087815 | 10/1967 |
| WO | WO 87/01724 | 3/1987 |
| WO | WO 88/09712 A1 | 12/1988 |
| WO | WO 94/12582 | 6/1994 |
| WO | WO 98/05728 A1 | 2/1998 |
| WO | WO 98/51476 A1 | 11/1998 |
| WO | WO 99/03306 A1 | 1/1999 |
| WO | WO 99/07774 | 2/1999 |
| WO | WO 00 34404 | 6/2000 |

OTHER PUBLICATIONS

J. Ray Ballinger, "Paramagnetism", Paramagnetic Material (1994-1996) at http://www.mritutor.org/mritutor/paragmag.htm.

J. Ray Ballinger, "Ferromagnetism", Ferromagnetic Material (1994-1996) at http://www.mritutor.org/mritutor/ferromag.htm.

Raymond A. Serway, "Hysteresis", Physics for Scientists and Engineers with modern Physics. Third Edition, Saunderts Golden Sunburst Series, pp. 852-862, 1992 (Abstract only, 2 pages) at http://www.ece.uic.edu/~kcha/hysteresis.htm.

Jon Dobson, "Magnetism in Matter and Magnetic Biomaterials", Centre for Science and Technology in Medicine, Keele University, Jan. 2000 at http://www.keele.ac.uk./depts/stm/magmaterials.htlm.

Jeff P. Anderson, et al., "Permeability and Hysteresis Measurement", 2000 CRC Press LLC, at http://www.engnetbase.com.

Wikipedia, The Free Encyclopedia, "Ferromagnetis", at http://en2.wikipedia.org/wiki/Ferromagnetism.

Wikipedia, The Free Encyclopedia, "Paramagnetism", at http://en2.wikipedia.org/wiki/Paramagnetism.

Wikipedia, The Free Encyclopedia, "Superparamagnetism", at http://en2.wikipedia.org/wiki/Superparamagnetism.

Sastri et al., "Reversible Crosslinking in Epoxy Resins," Journal of Applied Polymer Science, vol. 39, pp. 1439-1457, John Wiley & Sons, Inc. (1990).

G. Habenicht, Kleben: Grundlaten, Technologie, Anwendungen, 3rd Edition, Chapter 2.3.4.4 (1997).

Kirk-Othmer Encyclopedia of Chemical Technology, vol. 15, 3rd Edition, Chapter on Microwave Technology, John Wiley & Sons, Inc., (1981).

Testing of adhesives for metals and adhesively bonded metal joints; Determination of the shear strength of single lap joints in a shear by tension loading (DIN 53 283), pp. 1-5, Deutsches Institut fuer Norming e.V., Berlin, (Sep. 1979).

"Einfuehrung in die Festkoerperphysik", Dr. Charles Kittel, R. Oldenbourg Verlag Muenchen—Wien 1968, pp. 457 and 458.

* cited by examiner

PROCESS FOR ADHESIVE SEPARATION OF BONDED JOINTS

This application claims the benefit, as a divisional application, of U.S. application Ser. No. 10/111,958, filed Apr. 29, 2002 now abandoned, the specification of which is incorporated herein in its entirety. This application claims the priority of PCT International Application No. PCT/EP00/10276, filed Oct. 18, 2000, and DE 199 51 599.1, filed on Oct. 27, 1999.

The present invention provides a process for the reversible separation of bonded joints by applying electromagnetic alternating fields to the bonded joint. The invention also provides primer compositions which can be heated by electromagnetic alternating fields in order to bring about the intended adhesive separation of bonded joints.

Increasingly, in many branches of industry, in particular in metal processing industries such as the car industry, the commercial vehicle construction industry and the supply industries, and during the manufacture of machines and domestic appliances and also in the construction industry, identical or different metallic and non-metallic substrates are bonded together for bonding or sealing purposes. These types of joints for structural parts are replacing, to an increasing extent, the classical methods of joining such as rivets, screws or welds because the bonds/seals offer a number of technological advantages. In contrast to the traditional methods of joining such as welds, rivets or screws, the loosening and separating of bonded structural parts has not hitherto been solved in a satisfactory manner.

EP-A-735121 describes an adhesive film section for a residue-free and undamaged and separable bonded joint consisting of a double-sided adherent adhesive film with a grip projecting from the adhesive film by means of which the bonded joint can be loosened by pulling in the direction of the plane of the bonded joint. However, this method can be used only when the layer of adhesive in the adhesive film is a pressure sensitive adhesive. With this type of adhesive bond, however, only low tensile and peel strengths can be achieved so this method is suitable only for fixing small items such as hooks and the like in the domestic area.

DE-A-4230116 describes an adhesive composition containing a mixture of an aliphatic polyol and an aromatic dianhydride. This adhesive composition enables separation of a bonded joint in aqueous alkaline systems; soda solutions and caustic alkali solutions being mentioned as specific examples. It is proposed that these aqueous alkaline solutions be used for the economic production of magnet parts and other small parts, wherein the adhesive is intended to be used only to produce auxiliary adhesion during metal processing very similar adhesives are also known as label adhesives which facilitate the removal of labels from drinks bottles and similar containers in aqueous or aqueous alkaline media.

DE-A-4328108 describes an adhesive for floor coverings and a process for loosening these bonded floor coverings with the aid of microwave energy. For this purpose, the adhesive should be electrically conductive and be softenable using microwave equipment. Specific suggestions are solvent-free contact adhesives based on (aqueous) polymer dispersions which contain copper powder or aluminum powder. In accordance with the teaching of this document, in order to loosen the adhesive bond, the bonded pieces of floor covering are placed in a microwave unit by means of which the adhesive layer is softened so that the pieces of floor covering can be peeled off manually after softening of the adhesive layer.

WO 94/12582 describes a pressure sensitive adhesive based on a mixture of an aqueous polymer dispersion and an adhesive dissolved in an organic solvent as well as tackifiers and thickeners. This pressure sensitive adhesive has a constant adhesive force over a wide temperature range and enables mechanical separation of the bonded joints. It is stated that these bonded joints are suitable for the bonding of insulating and/or decorative two-dimensional parts such as e.g. insulating materials or plastics films.

DE-A-19526351 describes a loosening gel for lacquers, colorants and adhesives based on organic solvents with the addition of cross-linking, thickening and other conventional agents. Use as a peeling agent for the delamination of two component lacquers is mentioned as a specific area of application. Although it is mentioned that these types of mixtures may also be suitable for use with two component adhesives, no concrete data whatsoever is given about the loosening of these types of bonded joints. In a similar way, WO 87/01742 describes a composition for the removal of cured polysulfide sealants or coatings. In this case, an alkali metal or ammonium thiolate based on alkyl or phenyl thiolates is dissolved in a solvent or solvent mixture consisting of dimethylformamide or dimethylacetamide or mixtures of these with aromatic solvents such as toluene or xylene, and applied to cured polysulfide sealants or coating materials in order to be able subsequently to remove these from their substrates such as e.g. aeroplane tanks. Data relating to the loosening of bonded joints is not provided.

In the article "Reversible Crosslinking in Epoxy Resins", Journal of Applied Polymer Science, 39, 1439 to 1457 (1990), V. R. Sastri and G. C. Tesoro describe epoxy resins with different epoxy equivalents which are crosslinked with 4,4'-dithioaniline. In this article it is suggested that the crosslinked resin be milled to give particles with a size of 600 μm. This finely milled powder is then boiled under reflux in a solution of diglyme, hydrochloric acid and tributylphosphine until the milled resin has dissolved. Analogous disclosures are made by the same authors in U.S. Pat. No. 4,882,399. Concrete data relating to separable bonded joints is not provided in either document.

WO 99/07774 describes adhesives in which at least one structural component contains di- or polysulfide bonds and which can be loosened again after curing by applying solutions of separation agents based on mercapto compounds. This means that it is possible to separate bonded structural parts again at the glue line using chemical means. In accordance with the disclosure in this document, the separation agent can also be admixed to the adhesive formulation in a form which is inert at room temperature, wherein separation can take place after activating the reagent at elevated temperature. Specific examples of this inert form of the separating agent are not mentioned. Although the use of solvent-containing separating agents enables bonded joints to be loosened again, it is desirable to avoid the use of solvent-containing separating agents because this procedure is very time-consuming due to the diffusion-controlled time of action of the separating agents the handling of solvent-containing separating agents should be avoided in order to protect the environment.

The still unpublished DE-19924138.4 describes adhesive compositions in which nanoscale particles with ferromagnetic, ferrimagnetic, superparamagnetic or piezoelectric properties are present in a binder system. These adhesive compositions are suitable for producing separable bonded joints. Under the effects of electromagnetic radiation, these bonded joints can be heated so that the bonded joint is readily separable. The disadvantage of this procedure is the fact that the entire adhesive composition has to contain a sufficient amount of the corresponding nanoscale particles to absorb the electromagnetic radiation and be heated up thereby.

DE-A-35 01 490 describes, in the context of a car body, a glued-in glass pane with the use of an elastomeric crosslinked adhesive. On the surface of this pane, in the adhesive area, there is a conductive strip provided with electrical connections which carries a separating layer consisting of a thermally meltable material such as soft solder or a thermoplastic material on the face turned towards the adhesive. In order to loosen the bonded joint, an electric current is applied to the conductive strip, it warms up, the separating layer melts and the disc can be removed from the bodywork.

EP-A-0521825 describes a separable bonded joint in which the parts bonded together are joined by means of an adhesive strip introduced between them. This adhesive strip contains a flat thermoplastic separating element. This thermoplastic separating element contains intrinsically conductive polymers, electrically conductive carbon black, graphite, metal powder, metal fibers or metal filings, metal-coated fillers, metal-coated glass microbeads, metal-coated textile fibers or mixtures of these materials. On heating the bonded joint using electricity or by supplying radiation, this thermoplastic separating layer is softened so that the parts bonded together can be mechanically separated from each other. EP-A-521825 proposes, as a concrete example, that this type of separable bonded joint be used for direct glazing in the construction of vehicles.

In view of this prior art, the present inventor has the object of providing adhesive systems which are intended to facilitate the most efficient possible loosening of bonded joints. After bonding the relevant substrates with this adhesive system, the bond can be heated by applying an alternating electromagnetic field in order to loosen the bonded joint.

How this object is achieved can be seen in the claims. The invention is based substantially on the provision of primer compositions in which the binder contains nanoscale particles with ferromagnetic, ferrimagnetic, superparamagnetic or piezoelectric properties. The content of nanoscale particles in the primer compositions is 1 to 30%, preferably 2 to 20% by weight.

The present invention also provides separable bonded joints in which the friction-tight bonding of parts bonded together is brought about by a laminated bond consisting of a primer layer and an adhesive layer. Thus, a primer layer in which the binder matrix contains nanoscale particles is applied between the adhesive layer and at least one substrate layer.

A thermoplastic adhesive or else a thermoset adhesive may then be applied to the face of the primer layer turned away from the substrate.

The present invention also provides a process for loosening bonded joints with the aid of alternating electric, magnetic or electromagnetic fields, wherein the primer layer contains nanoscale particles which heat up the primer layer under the effect of these alternating fields. This heating of the primer layer is used to separate the bonded joint. The nanoscale particles are used as fillers with "signal receiving" properties so that the energy in the form of alternating electromagnetic fields is targeted for introduction into the primer layer. As a result of the energy input to the primer layer, there is a localized large increase in temperature, which facilitates reversible loosening of the bonded joint. In the case of non-reactive, thermoplastic adhesive systems, this energy input to the primer causes melting of the adjoining adhesive polymer, in the case of reactive, i.e. cross-linked thermoset adhesive systems, the rise in temperature leads to thermal degradation of the boundary layer of the polymer and thus to a break in the adhesive joint. In this context, particularly preferred adhesives are those which are either thermally labile themselves or in which the polymer backbone contains a few thermally labile groups. Modification of adhesives with thermally labile additives which can be activated as a result of a rise in temperature and thus can initiate failure of adhesion can also be successfully used for separable bonded joints according to the invention. Compared with traditional methods of warming, the process according to the invention is characterized in that heat production is locally defined in the boundary layer between the warm primer layer and the adjacent adhesive layer in the adhesive joint and that thermal stress to the bonded substrate materials and the adhesive matrix itself is avoided or minimized. The process is very time-saving and effective because the heat does not have to be introduced into the adhesive joint by a diffusion process through the bonded substrates. This process also reduces to a considerable extent the heat losses due to dissipation of heat or radiation of heat via the substrate or the adhesive matrix, which makes the process according to the invention especially economical. As a result of the locally defined increase in temperature within the primer layer the adhesive is selectively destroyed only at the primer/adhesive interface, which facilitates "quasi-adhesive" separation of the substrates.

Alternating electrical fields or alternating magnetic fields are suitable for the introduction of energy. When using alternating electric fields, piezoelectric compounds are suitable as the filler materials, e.g. guartz, tourmaline, barium titanate, lithium sulfate, potassium (sodium) tartrate, ethylenediamine tartrate, ferroelectric materials with a Perovskite structure and in particular lead zirconium titanate. When using alternating fields, basically any ferrimagnetic, ferromagnetic or superparamagnetic substances are suitable, in particular the metals aluminum, cobalt, iron, nickel, or alloys of these as well as metal oxides of the n-maghemite ($\gamma Fe_2O_3$) and n-magnetite ($Fe_3O_4$) type and ferrites of the general formula $MeFe_2O_4$, wherein Me represents a divalent metal selected from the group of copper, zinc, cobalt, nickel, magnesium, calcium and cadmium.

When using alternating magnetic fields, nanoscale superparamagnetic particles, so-called "single domain particles" are particularly suitable. When compared to the paramagnetic particles known from the prior art, nanoscale fillers are characterized in that such materials exhibit no hysteresis. This has the result that energy dissipation is not provoked by magnetic hysteresis losses but rather that heat production is attributed to vibration or rotation of the particles in the surrounding matrix during the action of an alternating electromagnetic field and thus ultimately to mechanical frictional losses. This leads to a particularly effective rate of heating of the particles and the matrix surrounding them.

"Nanoscale particles" in the context of the present invention are particles with an average particle size (or an average particle diameter) of not more than 200 nm, preferably not more than 50 nm and in particular not more than 30 nm. Particle size in the context of this definition means primary particle size. The nanoscale particles to be used according to the invention preferably have an average particle size in the range 1 to 40 nm, particularly preferably between 3 nm and 30 nm. In order to make use of the effects due to superparamagnetism, the particle sizes should be not more than 30 nm. The particle size is preferably determined by the UPA method (Ultrafine Particle Analyzer) e.g. by the laser scattered light method ("laser light back scattering"). In order to prevent or avoid agglomeration or merging together of the nanoscale particles, the surfaces of these are generally modified or coated. A process of this type for preparing agglomerate-free nanoscale particles, using iron oxide particles as an example, is given in DE-A-196 14 136 in columns 8 to 10. A few possibilities for surface coating these types of nanoscale particles in order to avoid agglomeration are given in DE-A-197 26 282.

The primer is applied either from solution or from dispersion to at least one substrate, but it may also be applied from the melt as a thin layer to at least one substrate.

In principle, any polymers suitable for adhesives may be used as the binder matrix for the adhesives to be used according to the invention. By way of example, the following thermoplastically softenable adhesives may be mentioned: hot-melt adhesives based on ethylene/vinyl acetate copolymers, polybutenes, styrene/isoprene/styrene or styrene/butadiene/styrene copolymers, thermoplastic elastomers, amorphous polyolefins, linear thermoplastic polyurethanes, copolyesters, polyamide resins, polyamide/EVA copolymers, polyaminoamides based on dimeric fatty acids, polyesteramides or polyetheramides. Furthermore, in principle known reaction adhesives based on single or two-component polyurethanes, single or two-component polyepoxides, silicone polymers (single or two-component) or silane-modified polymers such as are described, for example, in G. Habenicht, "Kleben: Grundlagen, Technologie, Anwendungen", 3rd edition, 1997 in section 2.3.4.4, are also suitable. (Meth)acrylate-functional reaction adhesives based on peroxidic curing agents, anaerobic curing mechanisms, aerobic curing mechanisms or UV curing mechanisms are also suitable as adhesive matrices. Specific examples of the incorporation of thermally labile groups into reaction adhesives for the purposes of subsequently separating these bonds are adhesives in accordance with WO 99/07774 in which at least one structural component contains di- or polysulfide bonds. In a particularly preferred embodiment, these adhesives may also contain solid separating reagents in crystalline, encapsulated, chemically blocked, topologically or sterically inactivated or kinetically inhibited, finely dispersed form such as are disclosed in the still unpublished DE-A-199 04 835.5, on pages 14 to 16. Another possibility is the use of polyurethane adhesives which contain, as separating agent, the amine derivatives disclosed in the still unpublished DE-A-198 32 629.7. The separating agents disclosed in the two previously mentioned documents are expressly mentioned as constituents of the present invention.

A suitable source of energy to heat up the adhesives containing nanoscale particles is, in principle, any high frequency alternating electromagnetic field. Thus, for example, electromagnetic radiation from the so-called ISM (industrial, scientific and medical application) range can be used. Further information about this may be found, inter alia, in Kirk-Othmer, "Encyclopedia of Chemical Technology", 3rd edition, vol. 15, chapter entitled "Microwave technology".

It has already been pointed out above that when using nanoscale particles in the context of this invention, the electromagnetic radiation can be made use of in a particularly effective manner. This is demonstrated particularly clearly in that even in the lower frequency range from about 50 kHz or 100 kHz up to 100 MHZ, almost any frequency can be used in order to produce the amount of heat in the adhesive matrix required to separate the matrix in the bonded joint. The choice of the frequency used may thus be guided by the equipment available and the signal receivers used, wherein obviously care must be taken to see that unwanted fields are not radiated.

In the following, the invention will be described using a few trials to demonstrate the principle involved, wherein the choice of examples is not intended to represent any restrictions on the scope of the invention, the examples simply show, in a model-like manner, the mode of action of adhesive compositions according to the invention.

EXAMPLES

A commercially obtainable PU-based solvent-containing primer from Bayer (Desmocoll 500, 15% strength in acetone/ethyl acetate) was modified with nanoscale magnetite particles (primary particle size 20 nm). The effect of the particle size on suitability as a signal receiver is described in still unpublished DE-19924138.4 and is expressly mentioned a constituent of this application. The proportion of magnetite particles was varied so that the dried primer layers contained a proportion by weight of 20% or 50% of energy absorbing particles.

The primer modified as described above was applied to different non-metallic adhesive substrates with the aid of a spreader knife. The thickness of the layer of dry primer was adjusted to 100 µm. After complete drying of the primer system, the substrates were bonded with a polyamide based hot-melt adhesive (Macromelt TPX22413, heat resistance 160° C.). In different trial runs, bonded joints with single or two sided primer coating were tested. After complete curing of the adhesive layer, the adhesive properties of the bonded joints were tested. The tensile shear strength (TSS) was determined in an analogous way to that described in DIN 53283. For this, test specimens from the particular substrate material (PVC, ABS, PC) with the dimensions 100×25×4 mm were bonded over an area of 20×25 mm and tested in the tensile test after about 24 hours (Zwick universal testing machine 144501). The results of the studies are given in table 1 and table 2.

TABLE 1

Adhesive properties of samples studied, with single-sided primer coating or no primer coating

| Test material | Tensile shear strength [N/mm$^2$] without primer | Primer modification [wt. %] magnetite | Tensile shear strength [N/mm$^2$] |
|---|---|---|---|
| PVC | MF | 50 | MF |
|  |  | 20 | 3.5 |
| PC | 1.62 | 50 | 0.87 |
|  |  | 20 | 1.72 |
| ABS | 2.55 | 50 | 1.66 |
|  |  | 20 | 2.4 |

(MF = material fracture)

TABLE 2

Adhesive properties of samples studied, with double-sided primer coating or no primer coating

| Test material | Tensile shear strength [N/mm$^2$] without primer | Primer modification [wt. %] magnetite | Tensile shear strength [N/mm$^2$] |
|---|---|---|---|
| PVC | 4.7 (MF) | 50 | 3.32 |
|  |  | 20 | 3.21 |
| PC | 1.62 | 50 | 2.94 |
|  |  | 20 | 3.01 |
| ABS | 2.55 | 50 | 2.66 |
|  |  | 20 | 2.98 |

(MF = material fracture)

Tests relating to unglueing these types of bonded joints were performed with the aid of an HF generator from the Hüttinger Co. A 4-turn coil with a diameter of 3.5 cm was used as the inductor. The working frequency of the generator was 1.8 MHZ, the power was 5 kW. The bonded joints were suspended in the coils under a tensile shear strain of 0.4 MPa. The recorded unglueing times, that is the time required to separate the bonded joints, over which the alternating magnetic field was applied are given in tables 3 and 4.

TABLE 3

Unglueing times for bonded joints tested in an alternating magnetic field with a single-sided primer coating

| Test material | Primer modification [wt. %] magnetite | Tearing apart time [s] |
| --- | --- | --- |
| PVC | 50 | 14 |
|  | 20 | 5 |
| PC | 50 | <1 |
|  | 20 | <1 |
| ABS | 50 | <1 |
|  | 20 | 1.4 |

TABLE 4

Unglueing times for bonded joints tested in an alternating magnetic field with double-sided primer coating

| Test material | Primer modification [wt. %] magnetite | Tearing apart time [s] |
| --- | --- | --- |
| PVC | 50 | <1 |
|  | 20 | 4 |
| PC | 50 | 10 |
|  | 20 | 3.4 |
| ABS | 50 | <1 |
|  | 20 | 5 |

Quasi-adhesive separation of the bonded joint was observed in the case of all the bonded joints tested, i.e. the single-sided primer coating on the adhesive remained almost completely on the substrate not coated with primer. In the examples with double-sided primer coating, the adhesion of the adhesive layer to both of the adjacent primer layers was reduced so far that very easy manual separation of the non-heated adhesive layer was possible.

The invention claimed is:

1. A separable bonded joint comprising an electromagnetically activatable primer layer and an adhesive layer adjacent to the primer layer, wherein the primer layer contains nanoscale particles with ferromagnetic, ferrimagnetic, superparamagnetic or piezoelectric properties.

2. An assembly of two or more substrates separably bonded in at least a friction-tight bond by a bonded joint between the substrates comprising a primer layer and an adhesive layer, wherein the primer comprises nanoscale particles with ferromagnetic, ferrimagnetic, superparamagnetic or piezoelectric properties.

3. The assembly of claim 2, wherein said primer is heatable by application of an alternating electromagnetic field.

4. The assembly of claim 2, wherein the nanoscale particles have an average particle size of less than of equal to 200 nm.

5. The assembly of claim 4, wherein the nanoscale particles have an average particle size of less than or equal to 100 nm.

6. The assembly of claim 5, wherein the nanoscale particles have an average particle size of less than or equal to 50 nm.

7. The assembly of claim 2, wherein the nanoscale particles comprise one or more piezoelectric substances selected from the group consisting of quartz, tourmaline, barium titanate, lithium sulfate, potassium tartrate, sodium tartrate, potassium sodium tartrate, ethylenediamine tartrate, ferroelectric compounds with a Perovskite structure, and lead zirconium titanate.

8. The assembly of claim 2, wherein the nanoscale particles comprise one or more ferromagnetic, ferrimagnetic or superparamagnetic substances selected from the group consisting of aluminum, cobalt, iron, nickel and their alloys, metal oxides of the n-maghemite ($\gamma$-$Fe_2O_3$) and n-magnetite ($Fe_3O_4$) type, and ferrites of the $MeFe_2O_4$ type, wherein Me represents a divalent metal selected from manganese, copper, zinc, cobalt, nickel, magnesium, calcium, and cadmium.

9. The assembly of claim 2, wherein said primer comprises 1% to 30% by weight of the nanoscale particles.

10. The assembly of claim 9, wherein said primer comprises 2% to 20% by weight of the nanoscale particles.

11. The assembly of claim 2, wherein said adhesive layer comprises a thermoplastic adhesive layer.

12. The assembly of claim 2, wherein said adhesive layer comprises a thermoset adhesive layer.

13. The assembly of claim 2, wherein said adhesive layer is free of said nanoscale particles.

14. The assembly of claim 2, wherein said primer layer is between the adhesives layer and at least one of the substrates.

15. The assembly of claim 2, wherein said bonded joint between the substrates further comprises a second primer layer, said adhesive layer spacing first and second primer layer.

16. A process for loosening the bonded joint of the assembly of claim 2, comprising subjecting the primer layer to an alternating electric, magnetic or electromagnetic field, wherein the primer layer is locally heated, whereby said bonded joint is separable.

17. The process of claim 16, wherein said adhesive layer comprises a thermoplastic adhesive layer and said adhesive layer had a boundary layer in contact with the primer layer, the boundary layer being heated by the primer layer to above the softening point of the thermoplastic adhesive, whereby the substrates can be separated.

18. The process of claim 16, wherein said adhesive layer comprises a thermoset adhesive layer and said adhesive layer has a boundary layer in contact with the primer layer, the boundary layer being heated by the primer layer to a temperature that breaks the cross-linked thermoset structure whereby the substrates can be separated.

19. A process of forming the assembly of claim 2, comprising applying the primer layer between the adhesive layer and at least one of the substrates.

* * * * *